United States Patent [19]

Maruta

[11] 4,048,447
[45] Sept. 13, 1977

[54] PCM-TASI SIGNAL TRANSMISSION SYSTEM

[75] Inventor: Rikio Maruta, Tokyo, Japan

[73] Assignee: Nippon Electric Company, Limited, Tokyo, Japan

[21] Appl. No.: 688,243

[22] Filed: May 20, 1976

Related U.S. Application Data

[63] Continuation-in-part of Ser. No. 557,835, March 12, 1975, abandoned.

[30] Foreign Application Priority Data

Mar. 15, 1974 Japan .................................. 49-30178
Mar. 22, 1974 Japan .................................. 49-32347

[51] Int. Cl.² .............................................. H04J 6/02
[52] U.S. Cl. .............................................. 179/15 AS
[58] Field of Search ........ 179/15 AS, 15 BA, 15 AV, 179/15.55 R

[56] References Cited

U.S. PATENT DOCUMENTS

| | | | |
|---|---|---|---|
| 3,311,707 | 3/1967 | Urquhart-Pullen | 179/15 AS |
| 3,466,398 | 9/1969 | Fraser et al. | 179/15 AS |
| 3,644,680 | 2/1972 | Amano et al. | 179/15 AS |
| 3,660,605 | 5/1972 | Rees | 179/15 AS |
| 3,836,719 | 9/1974 | Clark | 179/15 AS |
| 3,927,268 | 12/1975 | Sciulli et al. | 179/15 AS |
| 3,997,729 | 12/1976 | Costales | 179/15 AS |

Primary Examiner—Douglas W. Olms
Attorney, Agent, or Firm—Ostrolenk, Faber, Gerb & Soffen

[57] ABSTRACT

A PCM-TASI signal transmission system utilizes assignment control means responsive to an output signal from means for detecting the presence of information on each of a plurality (m) of input trunks arranged in time-serial fashion. The assignment control means selectively assigns a PCM signal representing the input trunk signal, during the period when information is present thereon, to one of a second plurality (s) of transmission channels (s<m). The assignment control means includes means for generating and transmitting signals representing the selected assignments state of the input trunks. The assignment control means includes improvements comprising a first memory for storing the number of each input trunk to which a transmission channel must be newly assigned; a second memory for storing data identifying each transmission channel ready to accept a new assignment to an input trunk; a third memory for storing the designation of a newly assigned input trunk and its transmission channel; a fourth memory, in the assignment state signal generation means, partially renewing its memory content according to the contents of the third memory; means responsive to the contents of the first through fourth memories for deciding each assignment and for renewing the contents of the memories after each new assignment decision; means for varying the sequence of output signal transmission from the information detector means to the assignment control means for at least every superframe; and means for varying the sequence of reading the second memory for at least every superframe.

7 Claims, 6 Drawing Figures

FIG. 1B.

PCM-TASI SIGNAL TRANSMISSION SYSTEM

This application is a Continuation-In-Part of Application Ser. No. 557,835, filed Mar. 12, 1975, now abandoned, by Rikio Maruta entitled "PCM-TASI SIGNAL TRANSMISSION SYSTEM" and assigned to the assignee of the present case.

BACKGROUND OF THE INVENTION

The present system relates to a PCM-TASI signal transmission system in which the TASI (Time Assignment Speech Interpolation) system and the TASI techniques are applied to the time division multiplex PCM (PULSE CODE MODULATION) signals.

The TASI system is a transmission system aimed at reducing the number of transmission channels and has been contemplated by selectively connecting a large number of input trunks to the transmission channels depending on whether voice signals are present at each input trunk, and it has largely contributed to reduction of the per-channel transmission cost particularly for long-distance international telephone lines such as the Trans-Pacific submarine cable. With regard to the basic principle of the TASI system, a detailed description is given in Literature (1) below, and so, no further description will be given about it.

Literature-(1): E. F. O'Neill, "TASI", Bell Laboratories Record, Vol. 37, No. 3, March 1959 p.p. 83–87

The principle of the TASI system can be applied not only to a frequency division analog transmission but also similarly to a time division multiplex PCM transmission, and it is extremely effective for radically reducing the number of transmission channels for the multiplex PCM signals. The latter application is called a PCM-TASI system, and R&D efforts in this field have been very active. With regard to the principle and construction of such a PCM-TASI system, a detailed description is made in literature-(2) below.

Literature-(2): C. Ota & K. Amano "A Digital Speech Interpolation System", Electronics & Communications in Japan, Vol. 56, No. 8, 1973, p.p. 26–34.

In a transmitter section of these TASI and PCM-TASI systems, four constituent elements are needed, that is, (1) a voice detector for detecting the presence of voice signals on the respective input trunks and for emitting requests for assignment of transmission channels, (2) means for deciding assignment between the input trunks and the transmission channels in accordance with the requests for assignment of transmisson channels from the voice detector, (3) means for informing the results of decision for assignment to a receiving section, and (4) means responsive to the results of assignment for controlling the switching between the input trunks and the transmission channels. The present invention relates, in particular, to the element (2) above, that is to a transmission channel assignment decision unit.

In a transmission channel assignment decision unit in the system disclosed in Literature-(2), monitoring of the transmission channels is carried out by means of an assigned channel number counter (CC), so that what can be monitored is limited solely to the number of channels and it is impossible to designate in connection with an assignment or unassignment of a particular transmission channel. However, under a practical operating condition, it can occur that a particular transmisson channel is desired to be monitored. It is highly desirable, for instance, in the case where the test signals are occasionally desired to be inserted forcibly into a particular transmission channel to check an error rate for the purpose of assuring reliability, or the case where the omission is desired of the particular transmission channel from practical use if said particular transmission channel is determined to be faulty as a result of the checking operation. As improvements in the above-referred transmission channel assignment decision unit, another transmission channel assignment decision unit has been known, in which in place of the above-referred assigned channel number counter there is provided a memory for storing possibilities of new assignment of the respective transmission channels so that a possibility of assignment can be arbitrarily designated for any transmission channel.

However, in these conventional transmission channel assignment decision units, since acceptance of assignment request signals from a voice detector is carried out in a sequence that is fixedly related to input trunk numbers, the frequency of rejection is different and non-uniform for every input trunk. Accordingly, provision is made such that the numbers of the input trunks whose assignment request signals cannot be accepted immediately are registered by means of a queuing buffer and they are processed with preference upon next assignment, whereby the probability of a particular input trunk being unable to be assigned with an idle transmission channel for a long period of time may be reduced. However, unless the capacity of the queuing buffer is as large as the memory capacity equivalent to the number of the input trunks, non-uniformity in processing among the input trunks would still remain. Even if the capacity of the queuing buffer is increased, the number of assignment requests that can be accepted at one time is limited, and therefore, merely increasing the buffer capacity for equalizing the input trunks in processing is extremely uneconomical. This is a first disadvantage in the prior art.

In addition, since the search for the transmission channels, that is, the read out of the memory for storing possibilities of new assignment of the respective transmission channels, is executed always in a fixed time sequence. The smaller the number of a transmission channel, the more frequently a new assignment is executed for that transmission channel. Still further, since provision is made such that once the assignment has been decided the same state of assignment is maintained so long as there remains a sufficient number of avilable transmission channels even if a voice signal should disappear from the input trunk for avoiding unnecessary disconnections, if the search for the transmission channels is always executed in a fixed sequence, then practically, transmission channels bearing smaller numbers are subjected to change in an assignment state immediately after the voice signal has disappeared. On the other hand, an input trunk that has been once assigned to a transmission channel bearing a larger number, would be scarcely subjected to release assignment. That is, assignment would become nonuniform and this is undesirable in view of the utilization of the transmission channels as well as transmission quality. This is a second disadvantage in the prior art.

BRIEF DESCRIPTION OF THE INVENTION

According to one feature of the present invention, there is provided a PCM-TASI signal transmission system comprising: 1st to $m$-th input trunks arranged time-serially and consisting of the repetition of frames and superframes to carry out time division multiplex transmission of a plurality of intermittent PCM information signals; information signal detector means for detecting if said information signal actually exists on each of said input trunks; 1st to $s$-th ($s<m$) transmission channels arranged time-serially similarly to said input trunks for transmitting said information signals received via said input trunks; connecting means capable of selectively connecting said input trunks to said transmisson channels; assignment control means responsive to an output signal of said information signal detector means for controlling said connecting means to selectively assign said transmission channels to those input trunks on which said information signals exist only while said information signal is sustained; means for generating signals representing the state of said selective assignment i.e., assignment state signals, and for transmitting the same along with said information signals; and means on the receiver side of said transmission system for detecting said assignment state signals and for distributing the information signals received via said transmission channels to 1st to $m$-th output trunks in a manner similar to the corresponding input trunks in response to said assignment state signal; characterized in that: said assignment control means includes a first memory responsive to the output signal of said informtion signal detector means for storing numbers of those among said input trunks to which said transmission channels need to be newly assigned, a second memory responsive to said assignment state signals for storing numbers of those among said transmission channels which are ready to newly accept assignment of the input trunks, a third memory for storing the numbers of the input trunk and transmission channel for which assignment has been newly decided, said means for generating assignment state signals including a fourth memory for partially renewing its memory contents according to the contents of said third memory, and means responsive to the contents of said first to fourth memories for deciding the assignment and for renewing the contents of said respective memories upon decision of the new assignment; that said transmission system comprises variable signal transmission means for varying the sequence of transmisson of the output signals from said information signal detector means to said assignment control means at least for every one of said superframes; and that said transmission system further comprises variable reading means for varying the sequence of readout of said second memory at least for every one of said superframes.

BRIEF DESCRIPTION OF THE FIGURES AND OBJECTS OF THE INVENTION

It is a principle object of the present invention to provide a PCM-TASI signal transmission system including a high-quality, low-cost transmission channel assignment decision unit in which a plurality of input trunks can be connected to transmission channels in a very uniform manner.

The above-mentioned and other features and objects of this invention will become more apparent by reference to the following description taken in conjunction with the accompanying drawings, in which.

DETAILED DESCRIPTION OF THE INVENTION

Figure 1A:
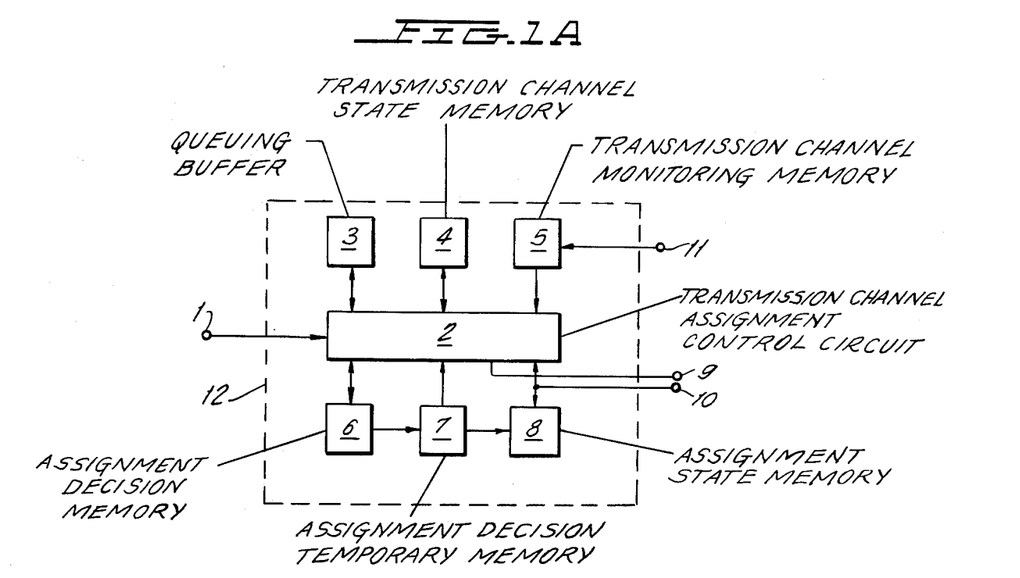
FIG. 1A shows in block diagram from one example of a transmission channel assignment decison circuit in the conventional PCM-TASI system.

Referring now to FIG. 1A, reference numeral 1 designates an input terminal for channel assignment request signals fed from a voice detector; 2, a transmission channel assignment control circuit; 3, a queuing buffer; 4, a transmission channel state memory; 5, a transmission channel monitoring memory; 6, an assignment decision memory; 7, an assignment decision temporary memory; 8, an assignment state memory; 9, an output terminal for coupling data to an assignment signal transmitter circuit; 10, an output terminal of assignment state signals for executing an assignment; and 11, an input terminal of signals for rewriting the contents of the transmission channel monitoring memory 5.

Figure 1B:
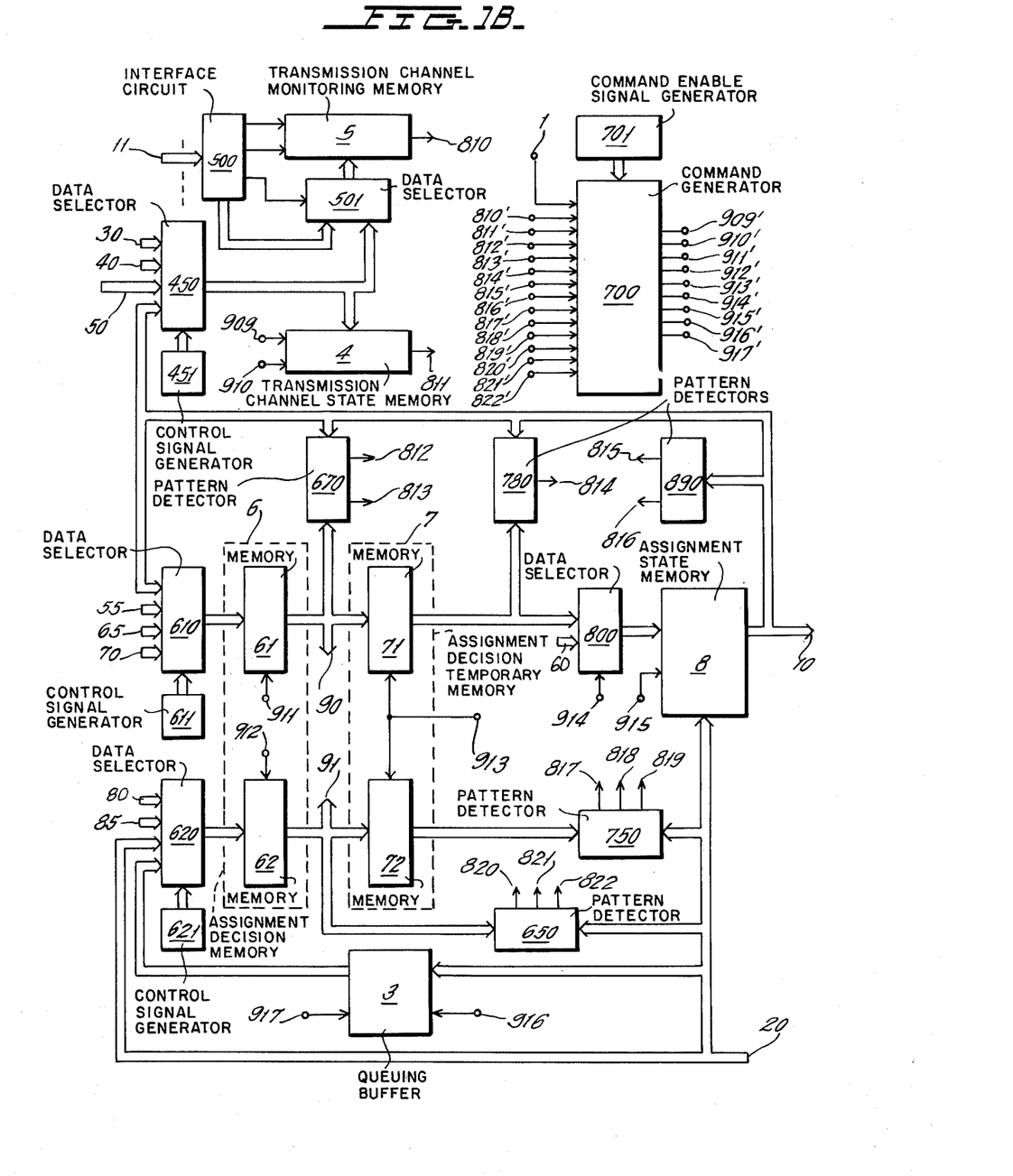
FIG. 1B is a block diagram showing in detail the assignment decision circuit of FIG. 1A.

In FIG. 1B, the like reference numerals 1-8, 10 and 11 denote like structural elements shown in FIG. 1A. Reference numerals 450, 501, 610, 620 and 800 indicate data selectors for selecting one of a plurality of input signals; 451, 611 and 621, control signal generators for producing selection control signals from timing signals (signals of lines 113, 115 and 117 shown in FIG. 3); 650, 670, 750, 780 and 890, pattern detectors; 500, an interface circuit; 700, a command generator comprising inverters, AND gates and OR gates, etc.; 701, a command enable signal generator for producing enable signals from the timing signals; 810-822, output terminals connected to input terminals 810'~822', respectively; 909-917, input terminals connected to output terminals 909'-917', respectively. The other reference numerals will be explained later.

The queuing buffer 3 uses the "first-in, first-out (FIFO)" concept. The input trunk number at the terminal 20 (that is, signal at line 115 shown in FIG. 3) is supplied to the queuing buffer 3. When the input terminal 916 receives a store command from the command generator 700, the buffer 3 stores the input trunk number. When the input terminal 917 receives a read-out command from the generator 700, the earliest registered data in the buffer 3 is read out and sent to the data selector 620.

The address of the transmission channel state memory 4 is assigned by the output of the selector 450 and the stored data thereof is sent to the generator 700 through the terminal 811. The content of the memory 4 is rewritten by the write-in command and the data (1 or 0) from the terminal 909' and 910' of the command generator 700. The data selector 450 is controlled by the control signal generator 451 so as to generally feed the input trunk number at the terminal 50 to the output thereof, and when occasion demands, to feed the other signals (for example, the signals at the terminal 10, 30 and 40).

The address of the transmission channel monitoring memory 5 is generally assigned by the output of the data selector 450. The content of the memory 5 is sent from the terminal 810 to the terminal 810' of the generator 700. The content of the memory 5 is rewritten by an input signal at the terminal 11 supplied through the interface circuit 500. That is, in the circuit 500, the address number rewritten is extracted from the input signal and a signal for controlling the data selector 501 is generated so that the memory 5 receives the address number from the circuit 500 through the data selector 501, and moreover the write-in data and write-in command are generated to renew the memory 5.

The assignment decision memory 6 comprises two memories 61 and 62 which store the transmission channel number (through the selector 610) and the input trunk number (through the selector 620) according to the write-in commands supplied to the terminals 911 and 912, respectively. The contents of the memories 61 and 62 are transferred from the terminals 90 and 91 (denoted as terminal 9 in FIG. 1A) to the assignment signal transmitter at the last frame of the superframe.

The assignment decision temporary memory 7 comprises two memories 71 and 72 which temporarily store the transmission channel number and the input trunk number until the numbers thereof are transfered to the assignment state memory 8 and the pattern detector 750, respectively. The content of the memory is written by a write-in command at the terminal 913 at the last time slot of each superframe.

The address of assignment state memory 8 is periodically assigned by the input trunk number at the terminal 20. Accordingly, the transmission channel number stored in the address coincident with each of the input trunk numbers appears periodically at the output terminal 10. When the pattern detector 750 detects the coincidence of the input trunk number at the terminal 20 and the number stored in the memory 72, the content of the memory 71 is stored in the address of the memory 8 corresponding to the input trunk number through the selector 800. The storing of the memory 8 is controlled by write-in command signals sent from the terminal 915' to the terminal 915. In this case, if the pattern detector 780 detects the coincidence of the content of the memory 71 and the output of the memory 8, and the pattern detector 750 detects the discordance of the content of the memory 72 and the input trunk number at the terminal 20, the detected signal at the terminals 814 and 817 are sent to the generator 700 and a command signal at the terminal 914' produced from the detected signals is sent to the terminal 914 of the selector 800 and thereby the selector 800 is controlled so as to store an NC (no connection) code or signal (for example, all 0) at the terminal 60 to the memory 8. This operation clears the previous assignment.

Figure 2:
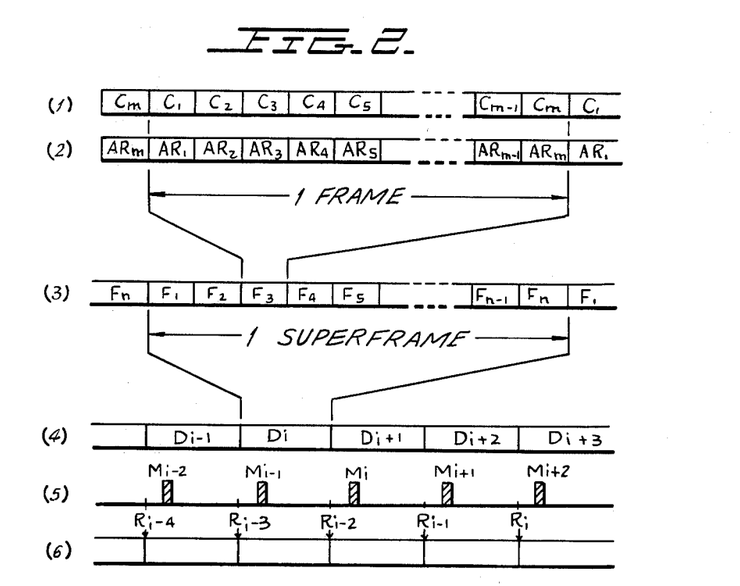
FIG. 2 is one example of a timing chart useful in explaining the operation of the circuit in FIG. 1A.

Let it be assumed that the total number of the input trunks is $m$, and that the signals on the $m$ trunks are applied to an input of a PCM-TASI transmitting terminal station after having been time division multiplexed into input trunk time slots $C_1, C_2, \ldots, C_m$ (each trunk signal consisting of l bits, where l is a positive real integer) as shown at (1) in FIG. 2. In a voice detector, existence of a voice signal on each input trunk is detected for every time slot, and according to the result of detection, transmission channel assignment request signals $AR_1, AR_2, ---, AR_m$ are delivered from its output as shown at (2) in FIG. 2. As shown at (2) and (3) in FIG. 2, one frame consists of $m$ transmission channel assignment request signals. Also as shown at (3) and (4) in FIG. 2, one superframe (the time duration of one superframe being a minimum time unit in which the connection between the input trunks and the transmission channels can be renewed) consists of n frames.

The assignment decision circuit 12 (in FIG. 1A or of FIG. 1B) is set at the initial stage at the beginning of a superframe. That is, an initial code is supplied to the terminals 70 and 80 shown in FIG. 1B. The initial code is a code signifying that the transmission channel and the input trunk have not yet been determined. At the initial setting, the data selectors 610 and 620 are controlled by the control signal generators 611 and 621 so as to send the initial codes to the memories 61 and 62, respectively. At the same time, the memories 61 and 62 store the initial codes according to the write-in commands at the terminals 911 and 912, respectively. This operation completes the initial setting.

Thereafter the acceptance of the transmission channel request signals incoming through the terminal 1 is carried out by making use of frame F1. When the transmission channel request signal $AR_i$ is 1, the $i$-th input trunk number appears at the terminal 20. This shows that the $i$-th input trunk is requires an assignment to a transmission channel. If the $i$-th input trunk has been already assigned to a transmission channel, the transmission channel number appears at the terminal 10 of the memory 8 and if the $i$-th input trunk has not been assigned to a transmission channel, the NC code appears thereat. The pattern detector 890 detects whether the output signal of the memory 8 is an NC code or not. If it is an NC code, the detected signal is sent from the terminal 815 to the terminal 815'.

When the $i$-th input trunk has not been assigned to a transmission channel and it is already in the process of being assigned, the input trunk number $i$ has already been stored in the memory 72. Accordingly, the pattern detector 750 detects the discordance of the content of the memory 72 and the input trunk number at the terminal 10, and the detected signal appears at the terminal 817 and is sent to the terminal 817'.

According to the detected signals at the terminals 815 and 817, the request signal $AR_i$ is determined to be a really fresh request and thereafter, the write-in command is sent to the terminal 916' through the terminal 916; and thereby the input trunk number i is stored in the queuing buffer 3. However, if there is no idle memory position in the buffer 3, the storing is not completed. At the same time, the content of the transmission channel state memory 4 is renewed. The address of the memory 4 corresponds to the transmission channel number. If the content of the memory 4 is 1, a voice signal exists on the transmission channel. Alternatively, if it is 0 (hereinafter this state of a transmission channel is called "idle" state), no voice signal exists thereon.

During this renewal, the data selector 450 is controlled by the signal from the control signal generator 451 so as to supply the output of the memory 8 to the address of the memory 4. Accordingly, if the $i$-th input trunk is assigned to a transmission channel, the address of the memory 4 is assigned by the transmission channel. At this time, the content of the memory 4 is renewed by the request signal $AR_i$ and the write-in command supplied to the terminals 909 and 910 through the terminals 909' and 910', respectively.

In this operation, the renewal of assignment is executed and thereafter, a new assignment decision is executed.

More specifically, in the transmission assignment control circuit 2 (FIG. 1), one of the idle transmission channels is selected and the number thereof is stored in the assignment decision memory 61. The selection of the idle transmission channels is executed by checking the output of the memories 4 and 5 in the command generator 700. At the same time, the search of the memories 4 and 5 is sequentially achieved by making use of the input trunk number supplied at the terminal 50 through the data selector 450, which is controlled by the command of the generator 451. Thus, the contents of the memories 4 and 5 in the transmission channel number corresponding to the input trunk number appear at the terminals 811 and 810, respectively. In the command generator 700, these outputs appearing at the terminals 810 and 811 are checked. Unless the use of the transmission channel number is inhibited by the transmission monitoring memory 5 and if an idle transmission channel number is found by the above-mentioned search, the write-in command is sent through the terminal 911' to the terminal 911 of the memory 61. Thus, the transmission channel number is written in the memory 61. At the same time, the control signal generator 611 controls the data selector 610 to feed the transmission channel number to the memory 61. The output of the memory 61 is supplied to the pattern detector 670 so as to be checked to determine whether or not the output is the NC code and, thereafter, the checked signal is sent through the terminal 813 to the generator 700. If the code excluding the initial code is stored in the memory 61, a write-in command is not supplied to the terminal 911. In other words, this shows that the idle transmission channel has already been selected.

In this manner, the selection of the idle transmission channel is achieved. The time required for this search is of the order of about ½ of a frame length because the total number of transmission channels is equal to about half of the total number of input trunks. After the search of the idle transmissional channels are executed in the above-mentioned manner, the input trunk to be connected to the selected idle transmission channel is determined in the following manner. In the same period of time, the data selector 620 is controlled by the control signal generator 621 so as to feed the output of the buffer 3 to the memory 62. The pattern detector 650 checks whether the output of the memory 62 is the NC code or not. The checked signal is sent through the terminal 820 to the generator 700.

In the generator 700, if the output signal of the memory 62 is the NC code, the read-out command is sent to the terminal 917 of the buffer 3 and thereby the earliest registered input trunk number is read out. The read-out content fed through the selector 620 to the memory 62 is stored by the write-in command from the generator 700. After the read-out operation, the same code as the NC code used for the initial setting is stored in the buffer 3 at the read-out address. Accordingly, when the content of the buffer 3 is empty, the memory 62 is held as it is in the initial state. The time required for this process is one time slot. If both the input trunk number and the transmission channel number have been respectively stored in the memories 62 and 61, by the time the memories are set for the initial state at the beginning of a superframe, it signifies that a new assignment has been established. On the other hand, if either one or both of them are lacking, it shows that the fresh assignment has been been completed.

The above-described operations can be fully completed within the three initial frames in one superframe, and other auxiliary operations are executed in the remaining frames by making use of the remaining numerals shown in FIG. 1B. For instance, in the case where an attempt to establish a new assignment has failed, the present state of assignment is transmitted to a receiver section in the system for confirmation purpose by making use of the idle state of the assignment signal transmission channel, and so, decision could be made to do so.

The above-mentioned assignment decision operations can be carried out within one superframe ($D_i$) as shown at (4) in FIG. 2, and in the next superframe ($D_i+1$) an assignment signal Mi is transmitted from the output terminal 9 to the receiver section through the assignment signal transmitter circuit as shown at (5) in FIG. 2. The assignment signal is decoded in the receiver section and is used to rewrite an assignment state memory in the receiver section after a predetermined delay time. This rewriting is simultaneously also carried out in the assignment state memory in the transmission section. The rewriting time point Ri is shown at (6) in FIG. 2. The assignment decision Di is notified at the time Mi and reveals itself at the time Ri as a renewal of the assignment state memory. The assignment decision temporary memory 7 in FIG. 1A is a temporary memory for storing the assignment decision until it is transferred to the assignment state memory.

As was described above, the result of assignment flows through the route of assignment decision memory 6 → assignment decision temporary memory 7 → assignment state memory 8 in every superframe, and in the assignment decision memory 6 a new assignment can be decided without delay in every superframe. Since the assignment state memory 8 emits at its output in every input trunk time slot a transmission channel number assigned to that input trunk, the input trunk is connected to the assigned transmission channel in response to that output signal. Other operations are similar to those described in the publications referred to hereinabove, and therefore, they are not described in detail herein.

As described in the introductory portion of the specification, in the conventional transmission channel assignment decision units, if acceptance of assignment request signals is carried out in a sequence that is fixedly related to input trunk numbers upon execution of transmission channel assignment, the frequency at which each input trunk is subject to rejection is different for every input trunk, and if an input trunk bears the last number, it is quite possible that that input trunk is always rejected and can never be assigned to a transmission channel. In order to eliminate such a disadvantage, heretofore, provision was made such that the numbers of the input trunks whose assignment request signals cannot be accepted immediately are registered by means of the queuing buffer 3 and they are processed with a preference upon execution of the next assignment. Thus, the fear that a particular input trunk will forever be deprived of assignment to an idle transmission channel can be eliminated. However, so long as the sequence for accepting the assignment requests is fixedly related to the input trunk numbers, there still remains a non-uniformity in the sequence of registration at the queuing buffer. Although this disadvantage is eliminated if the capacity of the queuing buffer is chosen to be equal to the number of the input trunks, this approach is uneconomical because of the resulting increase of hardware in the circuit construction. In other words, the first disadvantage as referred to in the introductory portion of this specification could not be avoided in the prior art.

Figure 3:
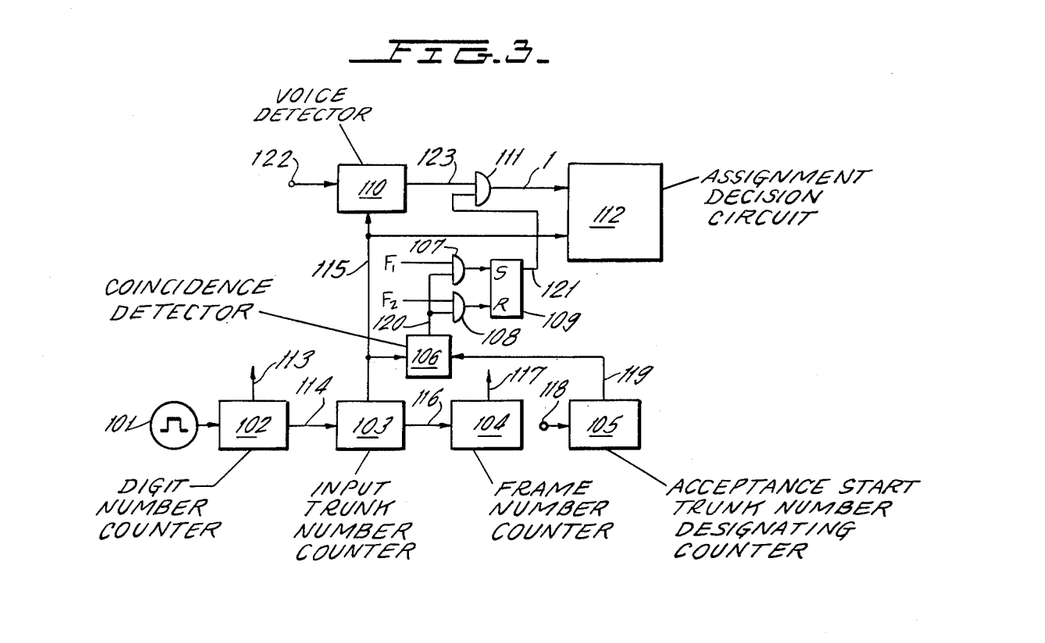
FIG. 3 shows, in block diagram form, one preferred embodiment of a transmission channel assignment decision unit in the PCM-TASI signal transmission system according to the present invention.

One preferred embodiment of the transmission channel assignment decision unit in a PCM-TASI signal transmission system according to the present invention, which is free from the above-described advantage, is shown in FIG. 3. This is a novel transmission channel assignment decision unit which enables all of the input trunks to be connected to the transmission channels in a uniform manner.

Referring now to FIG. 3, reference numeral 101 designates a clock signal in a transmitter section of a TASI or PCM-TASI signal transmission system; 102, a digit number counter; 103, an input trunk number counter; 104, a frame number counter; 105, an acceptance start trunk number designating counter; 106, a coincidence detector for two input codes; 107, 108 and 111, AND gates; 109, a set-reset type bistable flip-flop; 110, a voice detector for the input trunks; and 12, an assignment decision circuit as shown in FIG. 1A. The line 1 from the AND gate 111 to the assignment decision circuit 12 corresponds to terminal 1 of FIG. 1. Terminals 9, 10 and 11 of FIG. 1 have been omitted from FIG. 3 as no change in these terminals is made for this preferred embodiment. Among these elements, the elements 101, 102, 103 and 104 jointly form a timing circuit, which was naturally included together with the elements 110 and 12 in a PCM-TASI signal transmission system in the prior art. The circuit 12 is an element equivalent to the assignment decision circuit ADC in Literature-(2) above or to a circuit 12' in FIG. 5, to be described hereinbelow.

The digit number counter 102 frequency-divides a clock signal by a factor of l, and sends a carry to the input trunk number 103 through an output line 114 for every l clock signal. On an output line 113 appear digit pulses as shown at (1) in FIG. 4. The input trunk number counter 103 is a frequency-divider having a division factor $m$, and on its output line 115 are generated input trunk number designating codes representing 1st to $m$-th input trunks as shown at (2) in FIG. 4. In addition, a carry from this $1/m$ frequency-divider is applied through an output line 116 to the frame number counter 104, where the carry signal is frequency-divided by a factor of $n$. On an output line 117 are obtained codes for designating the respective frames as shown at (4) in FIG. 4. One superframe is constructed of the frame $F_1$ to $F_n$, and a new assignment of transmission channels is decided within a unit time consisting of one superframe.

Figure 4:
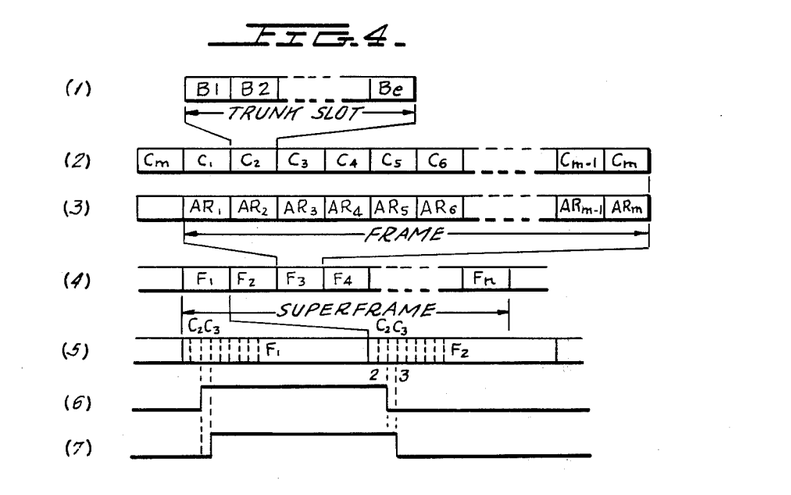
FIG. 4 is one example of a timing chart useful in explaining the operation of the unit in FIG. 3.

To the voice detector 110 are applied the signals on the respective input trunks in synchronism with the input trunk number designating code on line 115, for the corresponding input trunk; existence of a voice signal is detected for each input trunk in said voice detector, and in accordance with the results of detection, transmission channel assignment request signals $AR_1$, $AR_2$, ..., $ARm$ such as shown at (3) in FIG. 4 are generated on an output line 123. A practical example of such voice detectors is disclosed in Japanese Patent Application No. 94980/72 entitled "Time Division Multiplex Coded Voice Detector Device".

Such a transmission control assignment request signal from the voice detector 110 is applied to an input 1 of an assignment decision circuit 12, in which it is determined whether or not the assignment request signal is originated from an input trunk which has not been connected to a transmission channel so far, and if the result of determination is "yes", and if there exists an idle transmission channel, then a new assignment can be decided. If there exists no idle transmission channel to be assigned despite the result of determination of yes, then the input trunk number is retained in the queuing buffer. With regard to the method for controlling assignment of the transmission channels, it is quite the same as that described previously with reference to FIGS. 1A and 1B.

The present invention is characterized by a novel method and apparatus for applying the transmission channel assignment request signals from the voice detector 110 to the assignment decision circuit 12. According to the present invention, the transmission channel assignment request signals to be applied in sequence to the assignment decision circuit 12 would not always start from a particular input channel, but the start point is successively shifted from moment to moment. More particularly, in the illustrated embodiment, the output codes 115 of the transmission channel number counter 103 are compared at the coincidence detector 106 with the codes designated by a signal at a terminal 118 in the acceptance start trunk number designating counter 105, and if they coincide with each other, then an output line 20 is turned to 1. At this moment, if the frame number is $F_1$, then the AND gate 107 conducts and the flip-flop 109 is set, while if the frame number is $F_2$, then the AND gate 108 conducts and the flip-flop 109 is reset. In the frames other than $F_1$ and $F_2$, a gate signal 121 consisting of the output of the flip-flop is always 0. Accordingly, if the contents of the acceptance start trunk number designating counter 105 is, for example, 2, then the output of the flip-flop 109 changes to 1 in the input trunk slot $C_2$ of the frame $F_1$ and returns to 0 in the input trunk slot $C_2$ of the frame $F_2$ as shown at (5) and (6) in FIG. 4. The time interval of this output is equal to one frame. Only when the output of flip-flop 109 is 1, will the AND gate 111 be enabled to conduct, and one frame of assignment request signals from the voice detector 110, that is, those for all the input trunks, are fed to the assignment decision circuit 12. In the assignment decision circuit 12, it is only necessary to determine the correspondence between the input trunks and the transmission channels within the time period consisting of the frames $F_3$ to $F_n$. After this assignment decision has been completed, a pulse is applied to the terminal 118 to add one to the contents of the acceptance start trunk number designating counter 105. Accordingly, in the next superframe, the output of flip-flop 109 becomes 1 from the input trunk slot $C_3$ of the frame $F_1$ up to the time which is just before the line input trunk slot $C_3$ of the frame $F_2$ as shown at (5) and (7) in FIG. 4, so that the assignment request can be accepted starting from the input trunk $C_3$. Since the acceptance start trunk number designating counter 105 has the same number of internal states as the input trunk number counter 103, after the state where the assignment requests are accepted starting from the input trunk slot $C_m$ has been finally realized, the acceptance is once again started from the input trunk slot $C_1$. Carry pulses can be fed to the terminal 118 from the frame number counter 104.

While the gate signal 121 has been described as a continuous pulse having a pulse duration equal to one frame length and contained in the first and second frames in the above explanation, it need not always be a continuous gate signal, and also it could have a pulse duration longer than one frame length. In addition, although the gate signal 121 is successively shifted from moment to moment in the illustrated embodiment, the gate signal 121 may be shifted randomly.

As described above, the acceptance of the assignment requests from the respective input trunks can be equalized by adding a very simple circuit, and thus, the aforementioned first disadvantage can be eliminated. Here it is to be noted that even though the first disadvantage could be obviated, the lower the number of a particular transmission channel, the more frequently a new assignment is executed for that transmission channel, because the search for the transmission channels is always executed in a fixed sequence. As described previously, provision is also made in the conventional systems to avoid unnecessary disconnections, such that once an assignment has been decided the same state of assignment is maintained so long as there remains a sufficient number of available transmission channels even if a voice signal should disappear from the input trunk. However, if the search for the transmission channels is always executed in a fixed sequence, then practically, transmission channels bearing lower numbers are subjected to change in an assignment state immediately after the voice signal has disappeared. On the other hand, an input trunk that has been once assigned to a transmission channel bearing a higher number, would rarely be subject to release of assignment. In other words, the disadvantage, i.e., the above-mentioned second one, that the assignment would become uneven to impair the utilization of the transmission channels and the quality of transmission, cannot be obviated.

Now another preferred embodiment of the present invention capable of eliminating the aforementioned second disadvantage will be described with reference to FIG. 5.

Figure 5:
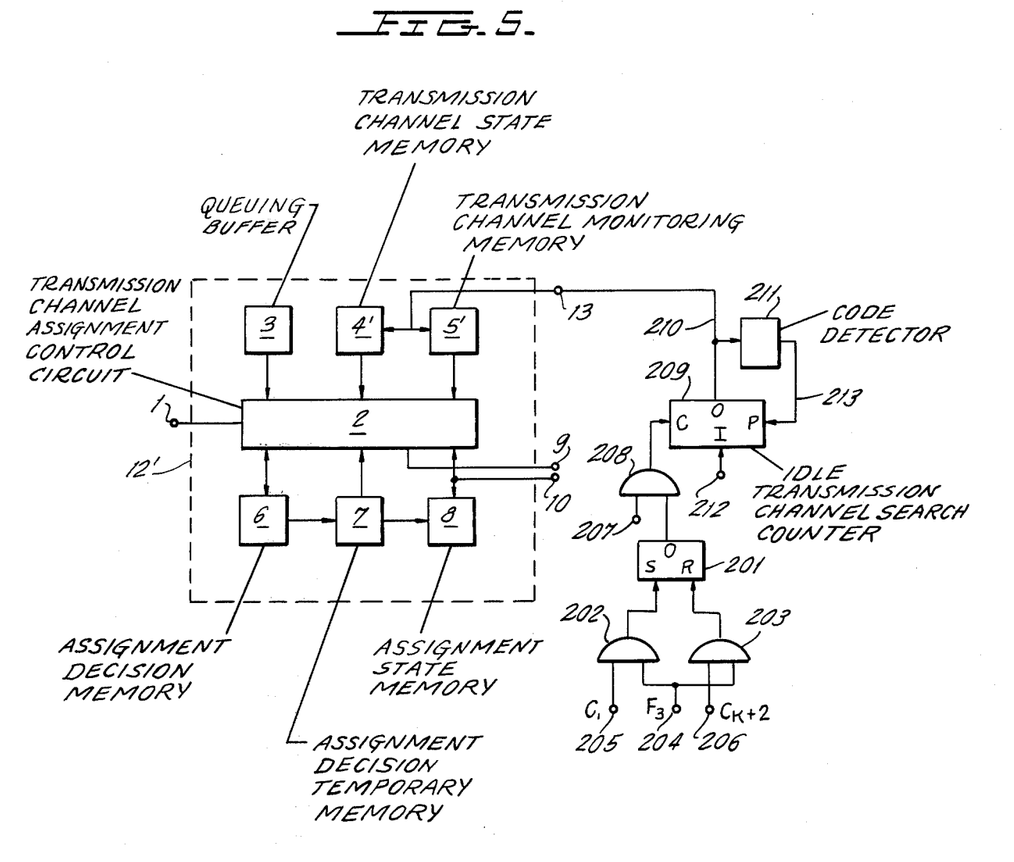
FIG. 5 shows a block diagram of another preferred embodiment of a transmission channel assignment decision unit in the PCM-TASI signal transmission system according to the present invention.

In FIG. 5, the constituent elements 1 to 3 and 6 to 10 encircled by a chain line frame 12' have the same constructions as the constituent elements 1 to 3 and 6 to 10 in the transmission channel assignment decision circuit 12 as described with reference to FIG. 1. The circuit 12' is different from the circuit 12 only in that address designation for a transmission channel state memory 4' and a transmission channel monitoring memory 5' is not carried out in the sequence of the input trunk time slot numbers $C_1, C_2, \ldots, C_m$ as is the case with the conventional assignment decision circuit 12. Instead it is carried out by means of a counter 209 coupled to both memories 4' and 5' via input 13, as described in the following. In the counter 209, symbol C represents a count pulse input, I, a preset input; P, a preset instruction input; and O, a count valve output. Reference numeral 211 designates a code detector for detecting if an output 210 of the counter 209 has reached a predetermined value; 202, 203 and 208, AND gate circuits; and 201, a set-reset type flip-flop. The counter 209 counts the output of the AND circuit 208. When its count value reaches a predetermined value set in the code detector 211, it is preset at a value given at a terminal 212. For example, if a binary code corresponding to 1 is applied to the terminal 212 and if the code detector 211 is set to a particular code, e.g., 120, then the counter 209 operates as a counter which counts from 1 to 120 and then again returns to 1 in response to application of the next count pulse. This counter is called the "idle transmission channel search counter".

Now it is assumed that the search for idle transmission channels is carried out in the frame $F_3$ shown at (3) in FIG. 2. Also, it is assumed that the maximum transmission channel number in the PCM-TASI signal transmission system in question is K. In the conventional system, the period extending from the first input trunk time slot $C_1$ to the K-th input trunk time slot $C_k$ of the frame $F_3$ was utilized and the address designation for the transmission channel state memory 4' and the transmission channel monitoring memory 5' was carried out by means of $C_i$ itself to execute the search for idle transmission channels. Although the memories 4' and 5' are described here as separate elements, they can be jointly considered as a memory for storing the possibilities of new assignment for the transmission channels. However, the present invention is characterized by the fact that the transmission channel state memory 4' and the transmission channel monitoring memory 5' are addressed by the output code of the idle transmission channel search counter 209 that is asynchronous with the input trunk time slot numbers. In the embodiment illustrated in FIG. 5, a terminal 204 has applied thereto a pulse for designating a frame in which the search is to be carried out. In the above-described case, the pulse is the one representing the frame $F_3$. To a terminal 205, on the other hand, is applied a pulse for designating the time slot $C_1$ and to a terminal 206 is applied a pulse for designating the time slot $C_{K+2}$. Accordingly, the flip-flop 201 is set at the beginning of the frame $F_3$ and is reset at the end of the time slot $C_{K+1}$, i.e., in the beginning of the time slot $C_{K+2}$ of the frame $F_3$. Thus, the width of the output pulse from the flip-flop 201 is equal to a time duration of $(K+1)$ time slots. The AND circuit 208 serves to feed the counter 209 with timing pulses at the rate of one per time slot which are applied to a terminal 207, only during the $(K+1)$ time slots designated by this flip-flop 201. Therefore, if the code detector 211 is set at K and if a preset code of 1 is applied to terminal 212, the output code of the idle transmission channel search counter 209 is not synchronized with input time slot numbers but shifted by one for every superframe, because $(K+1)$ count pulses are applied per one superframe. More particularly, assuming that in a given superframe the output of the counter 209 at the time slot C1 of the frame $F_3$ is 1, it becomes again 1 at the time slot $C_{K+1}$ of the frame $F_3$ in the same superframe, so that in the next superframe the counter 209 starts counting from 2. Thus, the above referred to second disadvantage in conventional systems can be completely eliminated because the sequence of search for idle transmission channels is different for every assignment decision. While a time duration equal to $(K+1)$ time slots was used for a search for K transmission channels in the above-described example, it need not be equal to $(K+1)$ time slots, but it could be equal to any integral multiple of the time slot, which integer is larger than $(K+1)$ but not equal to multiples of K. Though some transmission channels may be searched twice by employing a time duration of search longer than $(K+1)$ time slots, no disadvantage would result therefrom.

As described above, according to the present invention, all the idle transmission channels are responsive to new assignment requests with equal probabilities by adding only a simple circuit, and therefore, the invention is very effective for preventing degradation of transmission quality caused by frequent release of assignment, that is, for eliminating the above-referred to second disadvantage.

Obviously, in order to eliminate the above-referred to first and second disadvantages simultaneously, the assignment decision units illustrated in FIGS. 3 and 5 should be combined in cascaded connection with the circuit 12 in FIG. 3 replaced by the circuit 12' in FIG. 5. However, depending upon the traffic condition of the input trunks, the assignment decision unit illustrated in FIG. 3 or 5 can be used singly with a satisfactory result.

As described above, according to the present invention, it is possible to provide a PCM-TASI signal transmission system including a high-quality, low-cost, transmission channel assignment desicion unit in which a plurality of input trunks can be connected to transmission channels in a uniform manner.

Since many changes can be made in the above construction and many widely different embodiments of this invention can be made without departing from the scope thereof, it is intended that all the matter contained in the above description or shown in the accompanying drawing shall be interpreted as illustrative and not in a limiting sense.

I claim:

1. A PCM-TASI signal transmission system comprising:

1st to $m$-th input trunks arranged time-serially and consisting of a repetition of frames an superframes each comprised of n frames and adapted to carry out time division multiplex transmission of a plurality of intermittent PCM information signals, information signal detector means for sequentially detecting if said information signal actually exists on each of said input trunks and for transmitting an output signal only when said information signal is detected on the input trunk being monitored, 1st to $s$-th $(s<m)$ transmission channels arranged time-serially similarly to said input trunks for transmitting said information signal received via said input trunks, connecting means adapted to selectively connect said input trunks to said transmission channels, assignment control means responsive to the output signals transmitted in sequence from said information signal detector means for controlling said connecting means so as to selectively assign said transmission channels to those among said input trunks on which said information signals exist only during the period in which said information signal persists, means for generating signals representing the state of said selective assignment and for transmitting the same along with said information signals, and means on a receiver side of said transmission system for detecting said signals representing the state of assignment and for distributing the information signals received via said transmission channels to 1st to $m$-th output trunks in a manner similar to the corresponding input trunks in response to said signals representing the state of assignment; characterized in that said assignment control means includes a first memory responsive to the output signal of said information signal detector means for storing numbers of those among said input trunks to which said transmission channels need to be newly assigned, a second memory responsive to said signals representing the state of assignment for storing data identifying those among said transmission channels which are ready to newly accept assignment of the input trunks and for operating so as to read in sequence its stored data, a third memory for storing the numbers of the input trunk and transmission channel for which assignment has been newly decided, said means for generating signals representing the state of assignment including a fourth memory which partly renews its memory contents according to the contents of said third memory, and means responsive to the contents of said first to fourth memories for deciding the assignment and for renewing the contents of said respective memories upon decision of the new assignment; said transmission system comprising variable signal transmission means for varying the sequence of transmission of the output signals from said information signal detector means to said assignment control means at least for every one of said superframes; and that said transmission system further comprises variable reading means for varying the sequence of reading of said second memory at least for every one of said superframes.

2. A PCM-TASI signal transmission system comprising:

1st to $m$-th input trunks arranged time-serially and consisting of repetition of frames and superframes each comprised of n frames and adapted to be able to carry out time division multiplex transmission of a plurality of intermittent PCM information signals, information signal detector means for sequentially detecting if said information signal actually exist on each of said input trunks and for transmitting an output signal only when said information signal is detected on the input trunk being monitored, 1st to $s$-th $(s<m)$ transmission channels arranged time-serially similarly to said input trunks for transmitting said information signals received via said input trunks, connecting means capable of selectively connecting said input trunks to said transmission channels, assignment control means responsive to the output signals transmitted in sequence from said information signal detector means for controlling said connecting means so as to selectively assign said transmission channels to those among said trunks on which said information signals exist only during the period in which said information signal persists, means for generating signals representing the state of said selective assignment and for transmitting the same along with said information signals, and means on a receiver side of said transmission system for detecting said signals representing the state of assignment and for distributing the information signals received via said transmission channels to 1st to $m$-th output trunks in a manner similar to the corresponding input trunks in response to said signals representing the state of assignment; characterized in that said transmission system comprises variable signal transmission means for varying the sequence of transmission of the output signals from said information signal detector means to said assignment control means at least for every one of said superframes.

3. A PCM-TASI signal transmission system comprising:

1st to $m$-th input trunks arranged time-serially and consisting of repetition of frames and superframes each comprised of $n$ frames and adapted to carry out time division multiplex transmission of a plurality of intermittent PCM information signals, information signal detector means for detecting if said information signal actually exists on each of said input trunks, 1st to $s$-th $(s<m)$ transmission channels arranged time-serially similarly to said input trunks for transmitting said information signals received via said input trunks, connecting means capable of selectively connecting said input trunks to said transmission channels, assignment control means responsive to an output signal from said information signal detector means for controlling said connecting means so as to selectively assign said transmission channels to those among said input trunks on which said information signals exist only during the period in which said information signal persists, means for generating signals representing the state of said selective assignment and for transmitting the same along with said information signals, and means of a receiver side of said transmission system for detecting said signals representing the state of assignment and for distributing the information signals received via said transmission channels to 1st to *m*-th output trunks in a manner similar to the corresponding state of assignment; characterized in that said assignment control means includes a first memory responsive to the output signals of said information signal detector means for storing numbers of those among said input trunks to which said transmission channels need to be newly assigned, a second memory responsive to said signal representing the state of assignment for storing data identifying those among said transmission channels which are ready to newly accept assignment of the input trunks and for operating so as to read in secuence its stored data, a third memory for storing the numbers of the input trunk and transmission channel for which assignment has been newly decided, said means for generating signals representing the state of assignment including a fourth memory which partly renews its memory contents according to the contents of said third memory, and means responsive to the contents of said first to fourth memories for deciding the assignment and decision of the new assignment; an that said transmission system further comprises variable reading means for varying the sequence of reading of said second memory at least for every on of said superframes.

4. A PCM-TASI signal transmission system comprising:

1st to *m*-th input trunks arranged time-serially and consisting of repetition of frames and superframes each comprised of *n* frames and adapted to carry out time division multiplex transmission of a plurality of intermittent PCM information signals, information signal detector means for sequentially detecting if said information signal actually exists on each of said input trunks and for transmitting an output signal only when said information signal is detected on the input trunk being monitored, 1st to *s*-th (*s*<*m*) transmission channels arranged time-serially simiarly to said input trunks for transmitting said information signals received via said input trunks, connecting means capable of selectively connecting said input trunks to said transmission channels.

assignment control means responsive to the output signals transmitted in sequence from said information signal detector means for controlling sid connecting means so as to selectively assign said transmission channels to those among said input trunks on which said information signals exist only during the period in which said information signal persists.

means for generating signals representing the state of said selective assignment and for transmitting the same along with said information signals, and means on a receiver side of said transmission system for detecting said signals representing the state of assignment and for distributing the information signls received via said transmission channels to 1st *m*-th output trunks in a manner similar to the corresponding input trunks in response to said signal representing the state of assignment; characterized in that said assignment control means includes a first memory responsive to the output signal of said information signal detector means for storing numbers of those among said input trunks to which said transmission channels need to be newly assigned, a second memory responsive to said signals representing the state of assignment for storing data identifying those among said transmission channels which are ready to newly accept assignment of the input trunks and for operating so as to read-in sequence its stores data, a third memory for storing the numbers of the input trunk and transmission channel for which assignment has been newly decided, said means for generating signals representing the state of assignment including a fourth memory which partly renews its memory contents according to the contents of said third memory, and means responsive to the contents of said first to fourth memories for deciding the assignment and for renewing the contents of said respective memories upon decision of the new assignment; that said transmission system comprises variable signal transmission means for varying the sequence of transmission of the output signals from said information signal detector means to said assignment control means at least for every one of said superframes.

5. A PCM-TASI transmission system as claimed in claim 1, in which said variable signal transmission means includes selector means for selecting in the time domain the signals to be transmitted from said information signal detector means to said assignment control means, means for generating gate signals adapted to include a trunk slot of every input trunk at least once within one of said superframes and fordriving said selector means with said generated gate signals, and means for varying the time point when said gate signal is generated.

6. The system of claim 1 wherein said means for varying the sequence of transmission comprises first means for counting the number of channels in each frame;

second means coupled to said first counting means for counting the number of frames;

start trunk number means for storing a number from 1 to *m* representing a trunk starting number;

coincidence detector means for generating an output whenever the number in said first counting means coincides with the number in said trunk number storing means;

bistable means coupled to said coincidence means and said second means and being driven to a first state when said concidence output and a selected one of said frame number are simultaneously present and being driven to a second state when said coincidence output and another selected one of said frame members are simultaneously present;

gating means responsive to said bistable means for coupling said information signal detector means to said assignment control means only when said bistable means is in said first state to alter the order of assignment of said input trunks to said transmission channels.

7. The system of claim 1 wherein the variable reading means further comprises first means for counting said channels;

second meand coupled to said first counting means for counting the number of frames;

bistable means coupled to said second counting means and being driven to a first state when a selected one of said frame numbers and a selected one of said channel numbers is simultaneously present and being driven to a second state when said selected one of said channel numbers if simultaneously present witn another selected one of said channel numbers;

means coupled to said bistable means for generating pulses during the occurrence of each channel slot only when said bistable means is in said first state;

third means for counting said pulses and applying the accumulated count to said second memory means;

means coupled to the output of said third means for presetting a predetermined count in said third means to thereby alter the first count applied to said second memory means whenever said bistable means is in said first state.

* * * * *